Aug. 2, 1955
H. S. POWELL
2,714,517
SUSPENSION SYSTEM
Filed Jan. 31, 1950
2 Sheets-Sheet 1
FIG_1_
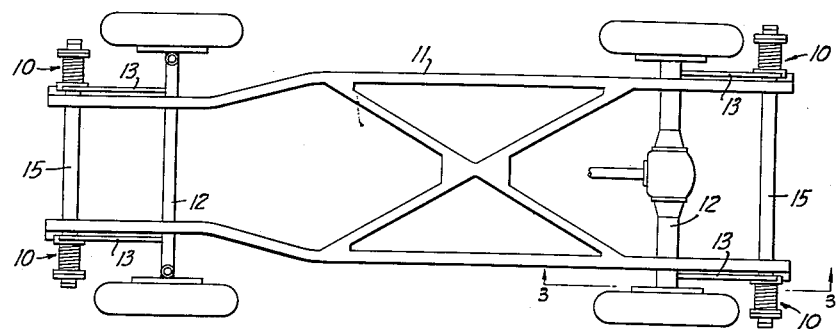
FIG_2_
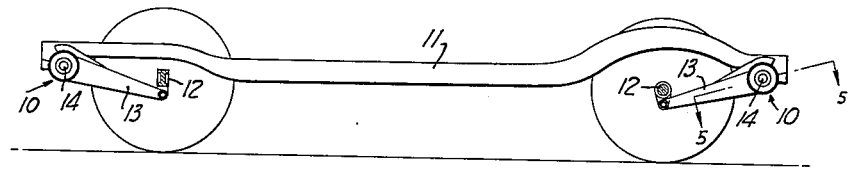
FIG_3_
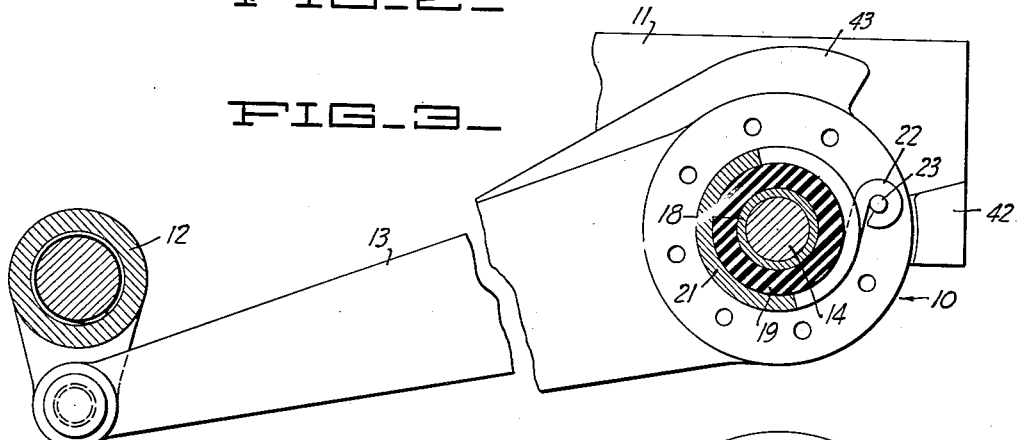
FIG_4_
FIG_10_
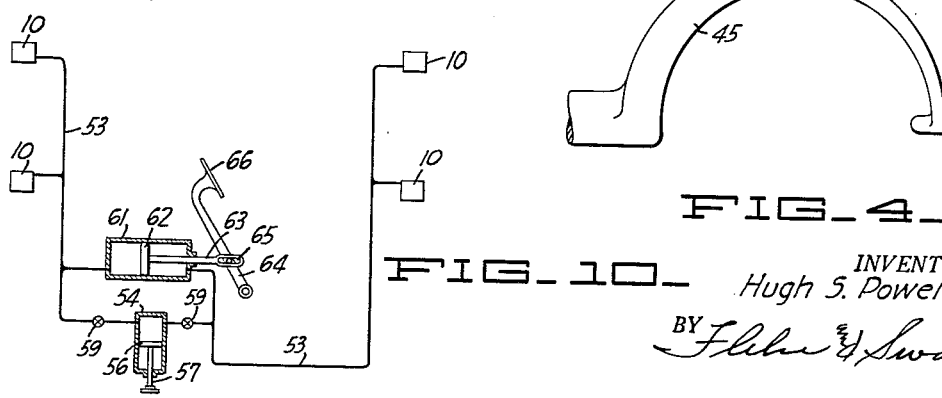
INVENTOR.
Hugh S. Powell
BY Fisher & Swain
ATTORNEYS

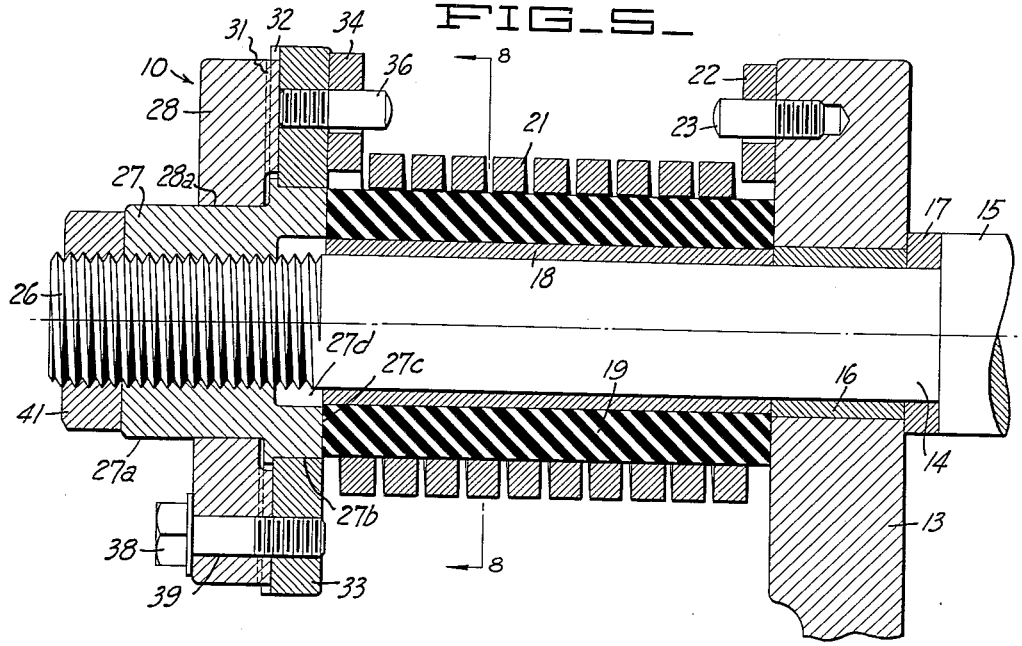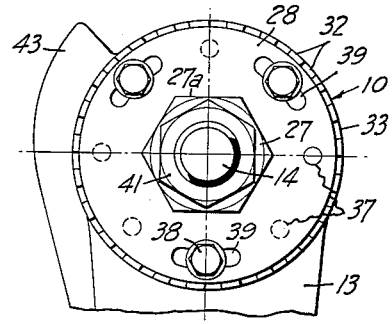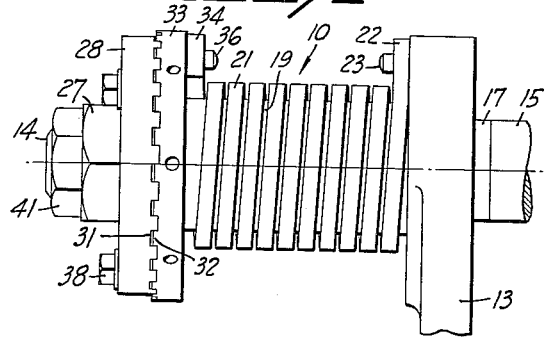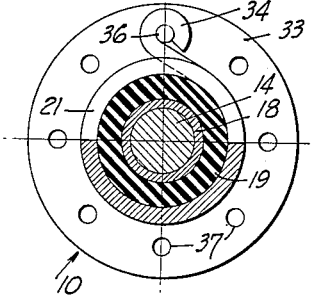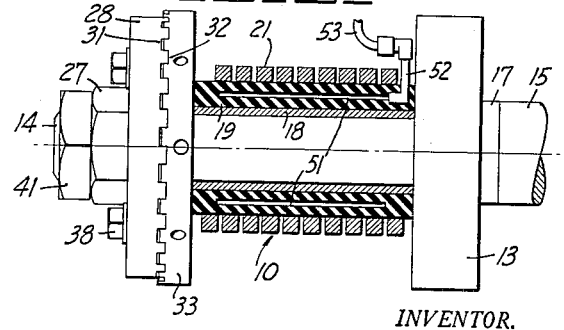

United States Patent Office 2,714,517
Patented Aug. 2, 1955

2,714,517

SUSPENSION SYSTEM

Hugh S. Powell, Menlo Park, Calif., assignor to Powell Spring Company, San Francisco, Calif., a corporation of California Application January 31, 1950, Serial No. 141,412

5 Claims. (Cl. 280—124)

This invention relates to suspension systems and particularly to devices for use on automobiles for controlling their riding qualities.

Various types of suspension systems have been utilized in the past. Among the most common of these is the use of full and semielliptical spring systems recently in vogue on conventional passenger and commercial vehicles and the coil spring arrangements currently featured. However, numerous other systems of the hydraulic and pneumatic type have been used.

All of these systems, however, are subject to varying difficulties, including particularly their failure to provide means for their adjustment to suit individual tastes. Millions of automobiles and commercial vehicles are manufactured and distributed each year whose riding qualities depend not upon the desire of the owner of the vehicle but upon the calculations of the manufacturer. The manufacturer designs the suspension system to provide riding comfort to the greatest number of potential purchasers. Hence the individual desires of a particular automobile owner may or may not be satisfied.

As a result, the riding qualities of the car are designed for a particular load. When the load is considerably less than the calculated optimum weight upon which the riding qualities have been factory determined, the automobile rides differently than when the load exceeds that weight.

It is an object of this invention to provide a suspension system which provides readily available adjustment means in order that the riding qualities of the vehicle may be determined by the user in accordance with his particular wishes.

It is a further object of this invention to provide a suspension system which is simple to manufacture, assemble, service and maintain.

Other objects and advantages of this invention will appear from the following specification taken in conjunction with the accompanying drawings in which:

Figure 1 represents a schematic plan view of an automobile frame, axle and wheel assembly illustrating the manner of incorporating my invention on a conventional automobile;

Figure 2 illustrates a side elevational view of the automobile frame suspension system illustrated in Figure 1;

Figure 3 is an enlarged view of one of the suspension levers illustrated in Figure 1 and taken along the line 3—3 of Figure 1;

Figure 4 shows a spanner wrench which may be utilized in connection with adjusting this device;

Figure 5 is an enlarged cross-sectional detail taken along the line 5—5 of Figure 2;

Figure 6 is an end view, in reduced scale, of the apparatus illustrated in Figure 5;

Figure 7 is a top plan view of one of the devices illustrated in Figure 1;

Figure 8 is a cross-sectional detail, in reduced scale, taken along the line 8—8 of Figure 5;

Figure 9 is a side elevation, partly in cross-section, of a modification of the device shown in Figures 1 to 8 inclusive; and Figure 10 is a diagrammatic view of a hydraulic control system adapted to be utilized in connection with the modification illustrated in Figure 9.

As illustrated in Figure 1, I have substituted for the conventional suspension system four assemblies 10 which suspend the frame 11 upon the axles 12, by means of suspension arms 13. Suspension arms 13 may be secured to axles 12 by any suitable connection as, for example, a ball and socket or pintle and gudgeon arrangement. No particular type of connection is specified herein inasmuch as the same is within the province of those skilled in the art and the specific type of connection may be varied to conform to various factors.

The suspension arms 13 are rotatably mounted upon spindles 14 formed on the ends of a pair of transverse frame members 15 which are rigidly secured to each end of the frame 11. Suitable bearings 16 and bushings 17 are provided on spindles 14 to permit the rotation or oscillation of the suspension arms 13 about the spindles 14.

Immediately adjacent the bearings 16, the spindle 14 is provided with a rotatable tubular metal sleeve 18 which forms a bushing for a larger tubular sleeve 19 made of rubber or other deformable material which, in turn, forms a base or cushion for a helically wound spring 21. One end of the helical spring 21 is secured to the suspension arm 13 by a loop 22 in one of its ends which engages a plug 23 which is threadedly mounted in the arm 13.

That portion of the spindle 14 beyond the outer end of the sleeve 18 is provided with suitable threads 26 and is adapted to accommodate an internally threaded member 27. Member 27 is provided with an outer hexagonal portion 27a and an inner round portion 27b, whose purposes will more fully hereinafter be explained. The face 27c on member 27 is adapted to engage the outer end of the tubular rubber sleeve 19. Annular recess 27d in member 27 (Fig. 5) is of greater diameter than the tubular member 18 in order that the member 27 may be moved to the right, as shown in Fig. 5, and fit over the tubular sleeve 18.

Circular disc 28 is provided with a hexagonal orifice 28a which is adapted to cooperate with hexagonal portion 27a of the member 27, whereby disc 28 may move longitudinally with respect to the member 27 but may not rotate with respect to the member 27. Therefore, when member 27 is turned, disc 28 turns. Conversely, when disc 28 is turned, member 27 turns.

The inner face of disc 28 is provided with a plurality of laterally extending jaws or teeth 31 which are adapted to cooperate with similar jaws or teeth 32 on an adjustment disc 33 which is rotatably mounted upon the round portion 27b of the member 27. The teeth 31 and 32 may engage and, when so engaged, serve to lock the members 28 and 33 against rotation. However, when the teeth 31 and 32 are disengaged, the member 33 may be rotated with respect to the members 27 and 28.

Spring 21 is provided at its outer end with a loop 34 which engages a pin 36 which is threadedly mounted on the rotatable member 33. Member 33 is also provided with a number of orifices 37 which are tapped to receive threaded bolts 38. Disc 28 is provided with a number of arcuate slots 39 for the introduction of bolts 38 whereby when the bolts 38 are introduced into the tapped orifices 37 and are tightened, the teeth 31 and 32 are held in engagement. As has previously been pointed out, when the teeth 31 and 32 are engaged the discs 28 and 33 are locked together. Since the members 27 and 28 are continually locked against rotation with respect to each other (by virtue of the cooperating hexagonal walls of portion 27a and the orifice 28a) it is obvious that when the teeth 31 and 32 are in engagement, the members 27, 28 and 33 form, in effect, a single unit.

A lock nut 41 is provided and is adapted to frictionally engage the outer end of the member 27 and to prevent rotation of the same with respect to member 14 when so engaged.

Operation of my device may briefly be described as follows: The members 15 are securely mounted with respect to the frame 11. On each of the spindles 14 there are provided substantially identical assemblies 10 which, as has previously been pointed out, consist of suspension arms 13 and the other previously described members. As the weight of the vehicle is transmitted to it, the suspension arm 13 tends to rotate upwardly about the axis of the spindle 14 and to wrap the spring 21 more tightly about the member 19. Since the springs are anchored to plates 33, the only resilience or "give" is formed in the member 19 which, it will be recalled, is made of deformable material. It will, of course, be assumed that the lock nut 41 and the member 27 are in engagement, preventing the rotation of the members 27, 28 and 33 with respect to the spindle 14.

If the previous adjustment of the assembly 10 has been insufficient to maintain the proper clearance between, for example, the axles 12 and the frame 11, a special tool 45 is caused to engage the outer periphery of the member 33 to hold it against rotation when it is freed from member 28. The bolts 38 may be loosened and the member 28 slid laterally in such a manner that the teeth 31 and 32 no longer engage. Member 33 is then rotated by the use of tool 45 in such a manner as to rotate the arm 13 about the axis of the spindle 14. The rotation of the member 33 is against the spring 21, if the weight to be carried is to be increased. The rotation of the member 33 is with the spring if the weight is to be decreased. When member 33 has been rotated sufficiently to bring the axle 12 and the frame 11 to the desired relationship, member 28 is slid to the right, as illustrated in Fig. 5, so that the teeth 31 and 32 engage. The bolts 38 are then tightened to prevent the disengagement of the teeth 31 and 32. In this manner the position of the suspension arm 13 is controlled and adjusted to a desired position.

However, in addition to providing means for adjusting the positioning of the frame 11 with respect to the axles 12 by adjusting member 33, I provide means for "softening" or "hardening" the ride. As has previously been pointed out, the member 27 is cut out to provide an annular recess 27d to fit over and slide about the metal sleeve 18. The face 27c engages the tubular rubber member 19 and as the member 27 is turned clockwise, as illustrated in Fig. 6, the surface 27c will be urged against the end of the sleeve 19, tending to deform the same in such a way that the diameter of the outer surface, against which the spring 21 is wrapped, will be increased, thereby decreasing the ready tendency of the sleeve 19 to deform. When the member 19 is thus deformed from the end, it presents a more resistant and less readily deformable peripheral surface to the spring 21. This results in a harder ride inasmuch as the action of the spring 21 is more limited. When the member 27 is moved to the left (Fig. 5) the effective diameter of the member 19 is decreased and it presents a more readily deformable surface to the spring 21. This results in a "softer" ride in that the range and action of the spring 21 is not so restricted.

Unlimited upward movement of the arms 13 is prevented by a stop 42 upon the frame 11 which may be engaged by a lug 43 upon arm 13 when the same is moved upwardly.

The modification illustrated in Fig. 9 differs from that illustrated in Figs. 1 to 8 inclusive primarily in that the deformable tubular member 19 is provided with an annular cavity 51 which is adapted to be connected through suitable stem 52 and conduit system 53 to a source of hydraulic fluid or air under pressure.

In the event the hydraulic fluid or air under pressure is introduced into the annular cavity 51 it will be obvious that the outer diameter of the member 19 will be increased or decreased in accordance with whether or not the amount of hydraulic fluid or air under pressure is increased or decreased.

As shown in Fig. 10 the annular cavities 51 in each of the tubular members 19 of assemblies 10, located at each corner of the vehicle are adapted to be connected through conduit system 53 to a hydraulic chamber 54 generally as shown. Hydraulic chamber 54 is provided with a piston 56 which is adapted to be operated by a screw member 57 whereby oil may be urged outwardly from the tank 54 through the conduit systems 53 into the annular chambers 51. When the proper quantity of hydraulic fluid has been urged into the annular cavities 51, the valves 59 are closed, thereby preventing hydraulic fluid from being vented from the cavities 51 and thereby retaining the riding qualities which have been sought.

When a quantity of hydraulic fluid is urged into the annular cavity 51 the tubular member 19 is expanded whereby the diameter of the outer surface against which the spring 21 is wrapped will be increased. When the quantity of hydraulic fluid within the annular chamber 51 is decreased, the effective outer diameter of the member 19 is decreased.

In the modification illustrated in Figure 9 the member 33 to which the spring 21 is secured is adapted to be rotatably mounted with respect to the spindle 14 and the members 27 and 28 in substantially the same manner as has previously been described in connection with the modification illustrated in Fig. 5. Likewise the members 28 and 33 (in Fig. 9) are adapted to be locked with respect to each other through studs 38. Rotation of the device 33, therefore, will serve the same purpose as has previously been explained in connection with the apparatus illustrated in Fig. 5.

As is also illustrated in Fig. 10 the conduits 53 from the devices 10 at the forward end of the vehicle terminate at one end of a hydraulic cylinder 61 while the conduits 53 from the devices 10 at the rear end of the vehicle terminate at the opposite end of the hydraulic cylinder 61. Located in the hydraulic cylinder 61 is a piston 62 operated by a connecting rod 63. The outer end of the connecting rod 63 is connected to an arm 64 on the foot brake lever 66 of the conventional vehicle through a lost motion connection 65. When the foot brake lever 66 is depressed beyond the lost motion phase the piston 62 will be moved to the left, as shown in Fig. 10, thereby forcing fluid through the conduits 53 into the cavities 51 in the devices 10 at the forward end of the vehicle and withdrawing a similar amount of fluid from the devices 10 at the rear end of the vehicle. In this manner the action of the springs 21 at the forward end of the vehicle is restrained and greater action of the springs 21 at the rear end of the vehicle is permitted. This results in a settling of the rear end of the vehicle and tends to prevent or overcome the rapid settling of the forward end of the vehicle when the brakes are applied.

Let it be assumed, however, that the cavity 51 is to be filled with air under pressure. In this event each of the conduits 53 will terminate in a suitable air valve, similar, for example, to that found on the ordinary automobile pneumatic tire. Air under pressure may be introduced into the cavities 51 through the conduits 53 in much the same manner as air is introduced into pneumatic tires. Since most establishments offering this service likewise provide suitable gauges and regulators, it is obvious that the pressure of the air introduced into the cavity 51 may be determined. Since air is a compressible fluid, a "hard" or "soft" ride is provided by increasing or decreasing the pressure within the cavity 51. As has previously been described, in connection with the modification illustrated in Fig. 5, an increase of air pressure within the cavity 51 also increases the effective diameter of the sleeve 19 and restricts the action of the spring 21, while a decrease in pressure within the cavities 51 has the reverse or opposite effect.

I claim:

1. In an automobile suspension system, a spindle secured to the frame of said vehicle, a suspension arm operatively connecting said spindle to the axle of the vehicle, a tubular member formed of deformable material and positioned about said spindle, a spring mounted on said spindle and wrapped about said tubular member, one end of said spring being secured to said spindle and the other end of said spring being secured to said suspension arm and tending to overcome the force exerted by the weight of the vehicle, said tubular member being provided with a co-axial chamber and means for forcing fluid into and out of said chamber to increase or decrease the resistance offered by said tubular member to said spring.

2. In an automobile suspension system, a spindle secured to the frame of said automobile, a suspension arm operatively connecting said spindle to the axle of said automobile, a tubular member formed of readily deformable material positioned about and co-axial with said spindle, a spring mounted upon said spindle and wrapped about said tubular member, one end of said spring being secured with respect to said spindle and the other end of said spring being secured to said suspension arm and tending to overcome the weight of said vehicle, means for increasing or decreasing the diameter of said tubular member comprising a co-axially aligned chamber therewithin and means for introducing or exhausting fluid from said chamber.

3. In an automobile suspension system, a plurality of suspension devices, each of said suspension devices comprising a spindle secured to the frame of the automobile, a suspension arm operatively connecting said spindle to the axle of said automobile, a tubular member formed of readily deformable material positioned on said spindle, said tubular member having a coaxially aligned chamber therewithin, and a spring mounted upon said spindle and wrapped about said tubular member, one end of said spring being secured with respect to said spindle, and the other end of said spring being secured to said suspension arm and tending to overcome the weight of said vehicle, and means associated with the brake pedal upon said vehicle for forcing fluid into the coaxially aligned chambers within said tubular members.

4. In an automobile suspension system, a spindle secured to the frame of the vehicle, a suspension arm journalled on said spindle and operatively connecting said spindle to the axle of the vehicle, a tubular sleeve of deformable material coaxially aligned on said spindle, a spring mounted upon said spindle and wrapped about the outer diameter of said tubular member, and adjustment means threaded on said spindle, one end of said spring being secured to said adjustment means and the other end of said spring being secured to said suspension arm, said spring tending to overcome force exerted by the weight of the vehicle, said adjustment means comprising deforming means for deforming said tubular member to increase its effective diameter, said deforming means including a member threaded on said spindle engaging one end of said tubular member, means for varying the tension on said spring, said last named means including a disc mounted on said member and attached to one end of said spring, and means for locking said disc, said member and said deforming means in predetermined positions.

5. In an automobile suspension system, a spindle secured to the frame of the vehicle, a suspension arm journalled on said spindle and operatively connecting said spindle to the axle of the vehicle, a tubular sleeve formed of deformable material coaxially aligned on said spindle, a spring coaxially aligned on said spindle and wrapped about the outer diameter of said tubular member, and adjustment means mounted on said spindle to vary the amount of tension on said spring, one end of said spring being connected to the suspension arm and the other end being connected to said adjustment means, said adjustment means comprising a member threaded on said spindle and having one face engaging one end of said tubular sleeve, a disc journalled on said member and secured to one end of said spring, a second disc nonrotatably mounted on said member and engaging said first named disc, means for detachably securing said second named disc to said first named disc, and lock nut means on said spindle for locking said last named member in a predetermined position.

References Cited in the file of this patent

UNITED STATES PATENTS

| | | |
|---|---|---|
| 1,692,881 | Wright | Nov. 27, 1928 |
| 1,970,823 | Suczek | Aug. 21, 1934 |
| 2,184,202 | Taschanz | Dec. 19, 1939 |
| 2,191,211 | Krotz | Feb. 20, 1940 |
| 2,380,191 | Sauzedde | July 10, 1945 |
| 2,477,822 | Probst | Aug. 2, 1949 |

FOREIGN PATENTS

| | | |
|---|---|---|
| 636,972 | Germany | Oct. 20, 1936 |